L. E. JONES.
DIRECTION INDICATOR FOR MOTOR VEHICLES.
APPLICATION FILED SEPT. 23, 1915.
1,245,731.
Patented Nov. 6, 1917.
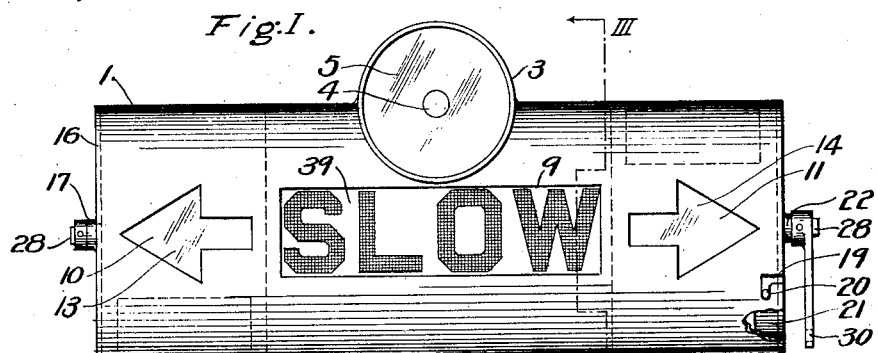
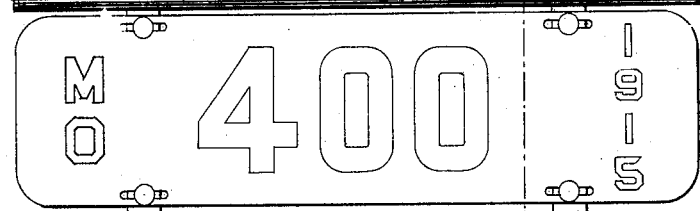
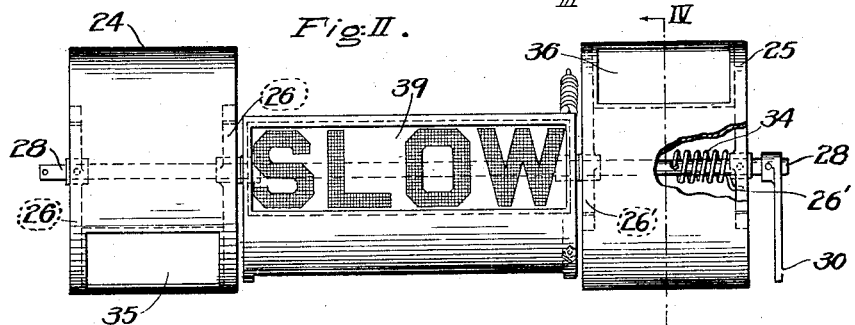
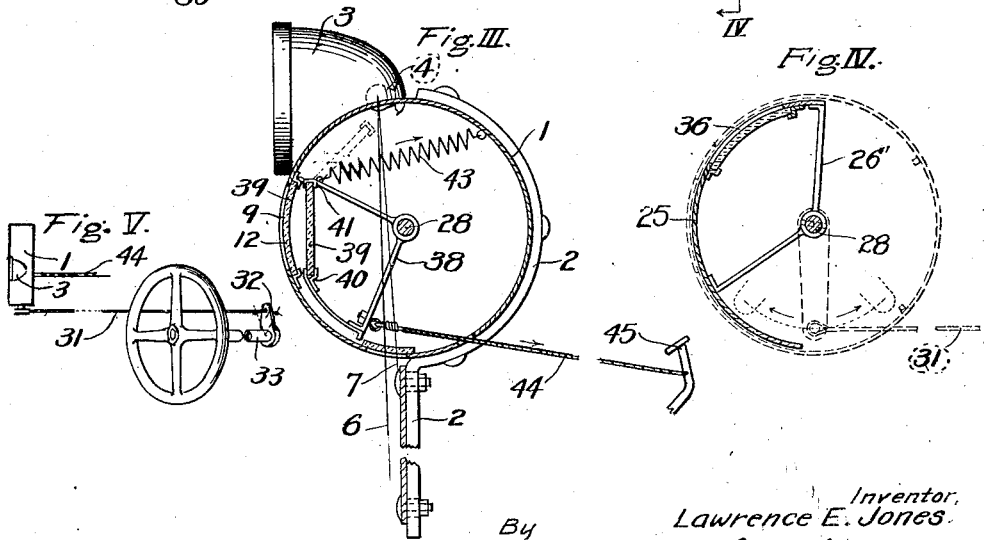
Inventor,
Lawrence E. Jones

UNITED STATES PATENT OFFICE.

LAWRENCE E. JONES, OF LIBERTY, MISSOURI.

DIRECTION-INDICATOR FOR MOTOR-VEHICLES.

1,245,731.     Specification of Letters Patent.     Patented Nov. 6, 1917.

Application filed September 23, 1915. Serial No. 52,253.

*To all whom it may concern:*

Be it known that I, LAWRENCE E. JONES, a citizen of the United States, residing at Liberty, in the county of Clay and State of Missouri, have invented certain new and useful Improvements in Direction-Indicators for Motor-Vehicles, and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an indicator for motor vehicles, and has for its principal object the indication to a driver of a vehicle following that upon which the device is mounted, information regarding the travel of the vehicle carrying the device, such as the direction in which such vehicle is about to turn, or the fact that the vehicle is about to stop or slow down.

In accomplishing this object I have provided improved details of structure, the preferred forms of which are illustrated in the accompanying drawing, wherein:

Figure I is an elevation of an indicating device containing my improvement.

Fig. II is a similar view of the movable parts of the indicator.

Fig. III is a transverse section on the line III—III, Fig. I.

Fig. IV is a section on the line IV—IV, Fig. II, particularly illustrating the direction indicating drums.

Fig. V is a detail view illustrating the connection between the steering mechanism and indicator drum.

Referring more in detail to the drawings:

1 designates a housing which is preferably cylindrical and provided with a bracket 2, whereby it may be mounted on a suitable portion of a motor vehicle, and which is adapted for carrying a tail light comprising the housing 3, lamp 4, and lens 5; such light being of any ordinary or suitable construction, but preferably of an electrical type as indicated by the circuit wires 6—7.

The housing 1 is provided with a longitudinal slot 9, that is preferably located directly beneath the tail light 3, through which a word or signal may be shown, as is presently described, and with apertures 10—11 adjacent its ends, for showing other signals, the said apertures here shown to consist of arrow shaped openings with the arrows pointing outwardly toward the ends of the housing, the slot 9 and the apertures 10—11 being preferably covered with transparent sheets or plates 12—13—14, preferably of mica or thin glass.

The housing 1 is closed at one end by a cap 16, having a central bearing 17 and is open at the opposite end, the open end being preferably provided with bayonet slots 19 for receiving the pins 20, of a closing cap 21, the cap 21 being also provided with a central bearing 22.

The operating mechanism of the indicator comprises drums 24—25, which are of such diameter that they will fit snugly within the housing but may freely rotate therein, the said drums being fixed on spiders 26—26' which in turn are rigidly mounted on a shaft 28 that is journaled in the bearings 17—22 in the end members of the housing 1, and spaced apart in order to afford a space for another indicator therebetween.

The shaft 28 is provided with a lever 30 having a flexible connection 31, with a lever 32 on the steering post 33, of the vehicle on which the indicator is mounted, and the connection is held taut by a spring 34 which is wound on the shaft 28 and is connected at its opposite ends with said shaft and with the bearing 17 of the housing 1, the parts being so arranged that the drums are yieldingly held in neutral position when the vehicle is traveling in a straight line direction.

Each of the drums 24—25 is provided with a panel 35—36 and the drums are so arranged on the shaft that when the parts are in neutral position the panel 35 will be at one side of the opening 10, while the panel 36 will be at the opposite side of the opening 11, in order that when the steering post is moved in one direc .on the spring 34 will draw the drum around to locate the panel 35 directly back of the opening 10, and when the post is moved in the other direction the parts will be revolved against the tension of the spring 34 to carry the panel 36 back of the opening 11, the said panels being preferably of ground glass colored red, so that when they are located back of the aperture, a person following in another vehicle will see the danger signal, consisting of the red arrow, and will know that the vehicle ahead is about to turn in the direction in which such arrow points.

Rotatably mounted on the shaft 28, between the drums, are spiders 38, and mounted on said spiders is a plate 39, preferably of ground glass, and bearing a suitable indication thereon in red, in order to attract and warn a driver of a following vehicle, the indication shown in the drawing consisting of the word "Slow" in red letters on a white glass background. The plate 39 is preferably oblong and is of such dimensions that it will cover the slot 9 in the housing 1, and the plate is preferably mounted on the spider by seating in grooved guides 40—41 that are carried by the spider arms.

Fixed to one of the guides, preferably the guide 41, is a spring 43, the opposite end of which is anchored to the housing 1 in order to yieldingly urge the spider frame toward the position indicated in dotted lines, Fig. III. Connected with the opposite edge of the spider frame is a flexible connection 44, which leads to a foot pedal 45, on the vehicle, which is preferably the foot pedal operating the brake, so that when the pedal is depressed to apply the brake to stop the vehicle, the spider frame is also automatically thrown around against the tension of the spring 43, to locate plate 39 back of the slot 9, and disclose the warning signal to a following driver.

Assuming that the parts are constructed and assembled as described on an ordinary motor vehicle, when the vehicle is traveling in straight line direction at normal speed, the slot 9 and apertures 10—11 will be blank and will give no information to the driver of a vehicle that may be following. Suppose, however, that the driver of the vehicle carrying the device wishes to stop or slow down his car, he applies the brake by depressing the pedal 45, this depression of the pedal simultaneously drawing on the connection 44, and pulling the spider frame around against the tension of the spring 43 to place the indicating signal back of the slot 9 in the housing 1, thereby signaling to a following driver that the forward car is slowing down or about to stop. The signal remains in signaling position until the brake is removed so that the car may start or accelerate its speed, the removal of the brake releasing the spider frame so that the spring may carry the frame back to its normal or non-indicating position. Should the driver of the car wish to turn to the right, he operates the steering post accordingly, such operation pulling on the connection 31 and rotating the drums 24 and 25 to bring the colored plate or panel 36 back of the arrow-like aperture 11, in the housing, which aperture pointing to the right indicates to the driver of the following vehicle that the car in front is to turn to the right. As soon as the vehicle resumes a straight line travel the spring 34 turns the drums to their normal or non-indicating position, and the aperture 11 again becomes blank or non-indicative. Should the driver wish to turn to the left he manipulates the steering post accordingly and the flexible connection 31 is released so that the spring 34 may turn the drums around to bring the panel 35 back of the aperture 10 on the left hand side of the housing. As this aperture points to the left the signal is given that the car carrying the indicating device will turn to the left.

It is apparent that as the indicating members are connected respectively to the brake pedal and the steering post, the operation of the indicator is automatic to give the proper signal.

Having thus described my invention, what I claim as new therein, and desire to secure by Letters-Patent, is:—

1. The combination with a housing having a plurality of openings therein, of connected drums rotatably mounted within the housing, and having signal panels in spaced relation to each other, yielding means for urging the drums in one direction and manually operable means for actuating the drums in the opposite direction against the tension of said yielding means.

2. The combination with a housing having openings therein, of spaced drums rotatably mounted within the housing and having signal panels on opposite sides of the respective openings, yielding means for urging the drums in one direction to locate one of the panels back of the corresponding opening, and manually operable means for moving the drums in the opposite direction to locate the other panel back of its opening, substantially as set forth.

In testimony whereof I affix my signature.

LAWRENCE E. JONES.